United States Patent [19]

Murata et al.

[11] Patent Number: 4,465,380

[45] Date of Patent: Aug. 14, 1984

[54] ELECTRONIC TIMEPIECE

[75] Inventors: Mitsuhiro Murata; Tomoko Tsunesumi, both of Tanashi, Japan

[73] Assignee: Citizen Watch Co., Ltd., Tokyo, Japan

[21] Appl. No.: 455,693

[22] Filed: Jan. 5, 1983

[30] Foreign Application Priority Data

Jan. 8, 1982 [JP] Japan ............................... 57-1082[U]

[51] Int. Cl.³ .......................... G04B 17/20; G02F 1/17
[52] U.S. Cl. ..................................... 368/202; 368/239; 340/785
[58] Field of Search .................. 368/202, 239; 340/785

[56] References Cited

U.S. PATENT DOCUMENTS 4,294,519 10/1981 Hashimoto ........................... 340/785

*Primary Examiner*—Bernard Roskoski
*Attorney, Agent, or Firm*—Jordan and Hamburg

[57] ABSTRACT

In an electronic timepiece provided with an electrochromic display device, temperature monitor circuit means are provided for periodically sampling the ambient operating temperature of the timepiece, to detect if that temperature is above an upper limit temperature. If that is detected, then a control circuit causes the display drive circuit of the timepiece to be inhibited from applying new write drive signals to the electrochromic display device, i.e. signals for setting display elements into the colored state. As a result, reduction of the operating lifetime of the electrochromic display device due to write-in operations being performed thereon under high temperature conditions is prevented.

3 Claims, 5 Drawing Figures

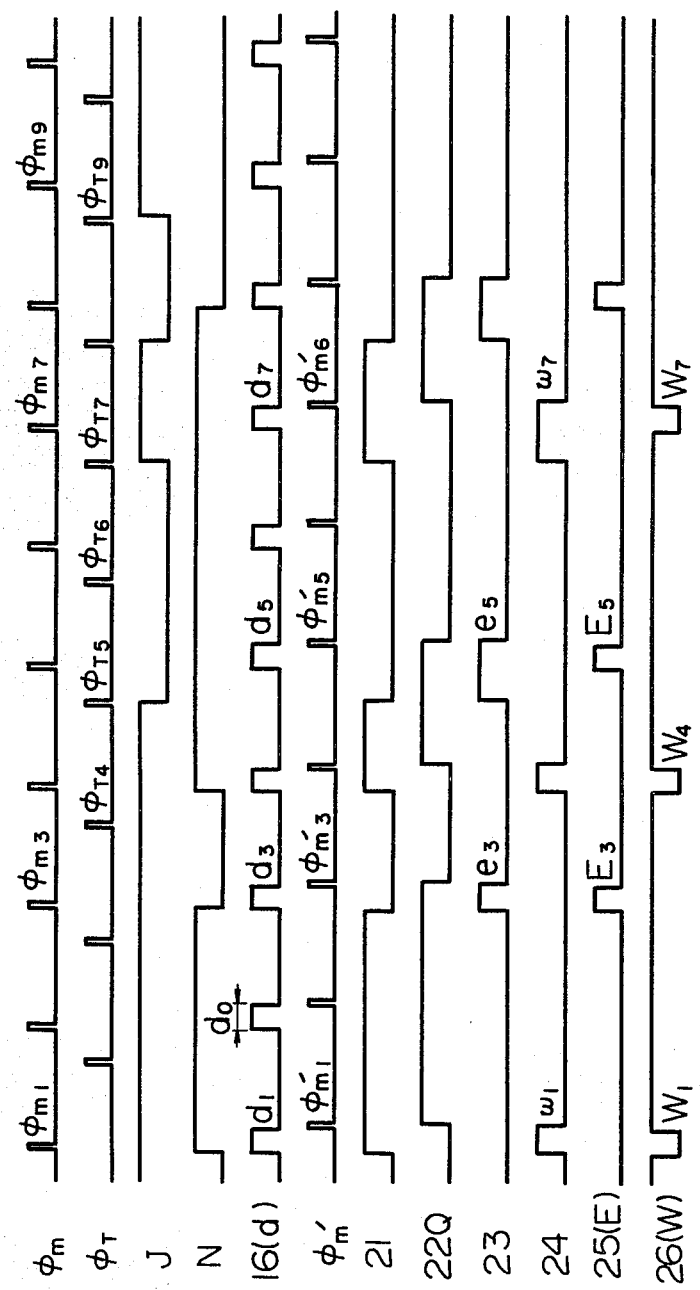

ELECTRONIC TIMEPIECE

BACKGROUND OF THE INVENTION

The present invention relates to an EC display type of electronic timepiece which is provided with an electro-optical display device comprising electrochromic (hereinafter abbreviated to EC) display elements.

As is well known in the art, an EC display cell has higher display contrast than a liquid crystal display cell, and the EC display elements themselves possess memory capabilities. Due to these advantages, it has been proposed to use such EC display elements for display devices in electronic timepieces. However, EC display elements are strongly affected by changes in the ambient temperature, and such changes can affect the display density, the speed of response, the maximum number of display write/erase operation repetitions (hereinafter referred to as the repetition lifetime), etc. In particular, if display write operations are repetitively carried out at an ambient temperature which is higher than a certain level, then the repetition lifetime referred to above will be considerably reduced. Thus, especially in the case of a wristwatch, which may be used under various environmental conditions, the disadvantages described above impose severe limitations on the use of EC display elements, and this is one reason why EC display type electronic timepieces have not been implemented on a practical basis.

It is an objective of the present invention to overcome the disadvantages of EC dispaly elements described above, and to provide an EC display type of electronic timepiece whose repetition lifetime will not be suddenly reduced if the electronic timepiece is left in a high-temperature environment.

SUMMARY OF THE INVENTION

The present invention comprises an electronic timepiece which is equipped with an electrochromic display device, and with means for periodically sampling the ambient operating temperature to detect whether the ambient operating temperature is above a predetermined upper limit temperature value. If such a condition is detected, then signals from the temperature detection circuit activate a control circuit to cause the display drive circuit of the timepiece to be inhibited from applying further write drive signals (i.e. drive signals which will cause display elements to be set in a "write," that is, colored, state) to the electrochromic display device. In this way, even if the electronic timepiece is left in a very high temperature environment, the operating lifetime of the electrochromic display device, i.e. the maximum possible number of write operations which may be performed thereon, will not be reduced.

In addition, it is possible to arrange that, when the ambient operating temperature rises above the upper limit temperature, the control circuit causes the display drive circuit to apply erase drive signals to those display elements which are in the "write," i.e. colored condition, to thereby set these in the erased (sometimes called bleached) condition. In this way, unnecessary power dissipation will be avoided if the electronic timepiece is left in a high ambient operating temperature for a long period.

The temperature sensing operations are performed on a regular periodic basis. For satisfactory operation, it is necessary to ensure that the timings of these temperature sampling operations do not overlap in timing with display write or erase drive operations.

BRIEF DESCRIPTION OF THE DRAWINGS

FIG. 5 is a timing chart for illustrating the operation of the circuit of FIG. 4.

DESCRIPTION OF THE PREFERRED EMBODIMENTS

Figure 1:
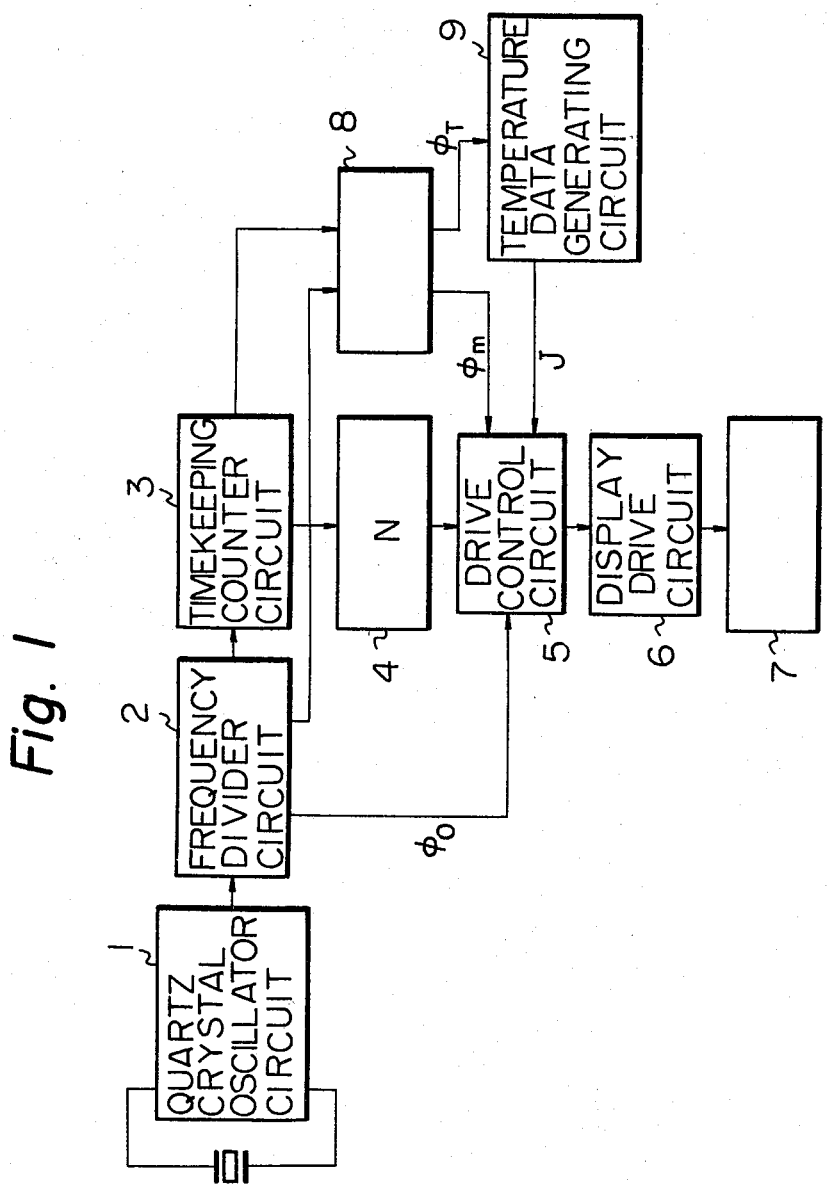
FIG. 1 is a simplified block circuit diagram of an embodiment of an electronic timepiece according to the present invention.

FIG. 1 to FIG. 5 show a first embodiment of the present invention. FIG. 1 is a block circuit diagram of the electronic timepiece of this embodiment. In FIG. 1, numeral 1 denotes a quartz crystal oscillator circuit, numeral 2 denotes a frequency divider circuit, numeral 3 denotes a timekeeping counter, and numeral 4 denotes a decoder circuit. These can have the same configuration as in a prior art type of liquid crystal display electronic timepiece. Numeral 5 denotes a drive control circuit, numeral 6 a drive circuit, numeral 7 denotes EC display elements, numeral 8 denotes a clock pulse generating circuit, and numeral 9 denotes a temperature data generating circuit. The clock pulse generating circuit 8 produces clock pulse signals $\phi m$ and $\phi t$, which are of opposite phase and have the same period as the timekeeping advancement period of the least significant display digit of EC display elements 7 (for example in the case of an electronic timepiece which displays the hours and minutes of time, this would be a period of one minute). These clock signals $\phi m$ and $\phi t$ are input to drive control circuit 5 and to the temperature data generating circuit 9, respectively. Signal $\phi m$ is synchronized with the advancement timing of the least significant timekeeping digit referred to above of timekeeping counter 3 (i.e. the rising edge of the one-minute signal). As a result, signal $\phi m$ always corresponds in timing with changes in the display signals output from decoder 4. Signal $\phi t$ serves the functions of controlling the timing of writing in temperature detection results to a memory, and as a sampling signal to control the period of repetitive sampling (i.e. temperature sensing) operations performed by temperature data generating circuit 9. It is necessary for signal $\phi t$ to be displaced in timing with respect to signal $\phi m$ by an amount which is greater than the time required to complete a write or erase drive operation. As described hereinafter, this is accomplished by arranging that the initiation of a display write or erase drive operation is synchronized with the rising edge of signal $\phi m$. Signal $\phi t$ is thereby prevented from overlapping in timing with a display write or erase operations, i.e. is generated at a different timing therefrom.

Figure 2:
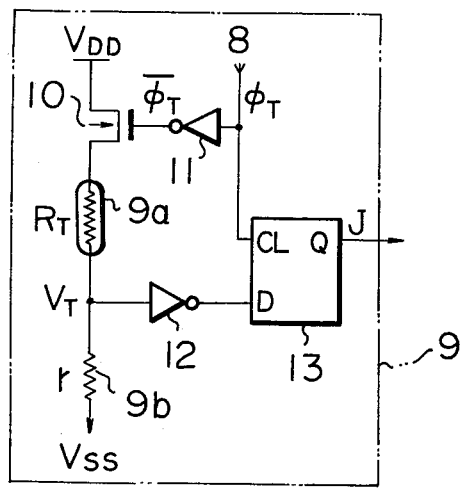
FIG. 2 is a circuit diagram of a temperature sensing circuit for the embodiment of FIG. 1.
Figure 3:
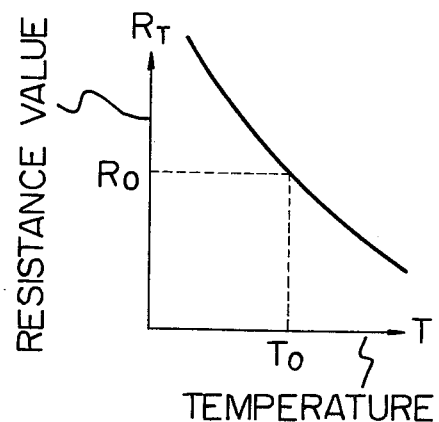
FIG. 3 is a graph showing the temperature/resistance characteristic of a thermistor use in the circuit of FIG. 2.

Referring now to FIG. 2, an example of a circuit is shown for a limit temperature detection circuit and for a detection result memory circuit which form the temperature data generating circuit 9. This comprises an N-channel FET 10, a thermistor 9a whose resistance value rt varies in accordance with changes in at T as shown in FIG. 3, a fixed resistor 9b whose resistance is r, inverters 11 and 12, and a data-type flip-flop (abbreviated in the following to D-FF) 13, which serves as the detection result memory circuit. As a result of changes in the resistance value rt of the thermistor 9a caused by changes in the ambient temperature T, corresponding changes are produced in a voltage-divided potential Vt generated at the junction of the thermistor 9a and the fixed resistor 9b. Operations are periodically carried out to determine whether the level of this voltage Vt is higher than or less than the threshold voltage of inverter 12. The results of this detection are memorized in the memory circuit comprising D-FF 13. When the ambient temperature of the timepiece environment reaches a predetermined upper limit temperature, the resistance rt of the thermistor 9a reaches a value R$\emptyset$. The value r of the fixed resistor 9b is set such that the level of voltage Vt at this time exceeds the threshold level of inverter 12, so that the logic level of the output from inverter 12 becomes inverted. Thus, when the ambient temperature T exceeds the upper limit temperature, the output from inverter 12 goes to the L logic level, while when the value of T becomes lower than T$\emptyset$, the output from inverter 12 goes to the H logic level. In this embodiment, the N-channel FET 1$\emptyset$ goes into the ON state each time the output signal $\phi$t from inverter 11 goes to the L level, that is, each time a pulse of signal $\phi$t is applied to the gate electrode of N-channel FET 1$\emptyset$. A temperature sensing operation is thereby performed, as described above. In addition, each time a falling edge of a pulse of signal $\phi$t occurs, then the logic level of the output from inverter 12 is stored in D-FF 13, i.e. the next temperature sensing operation takes place.

Figure 4:
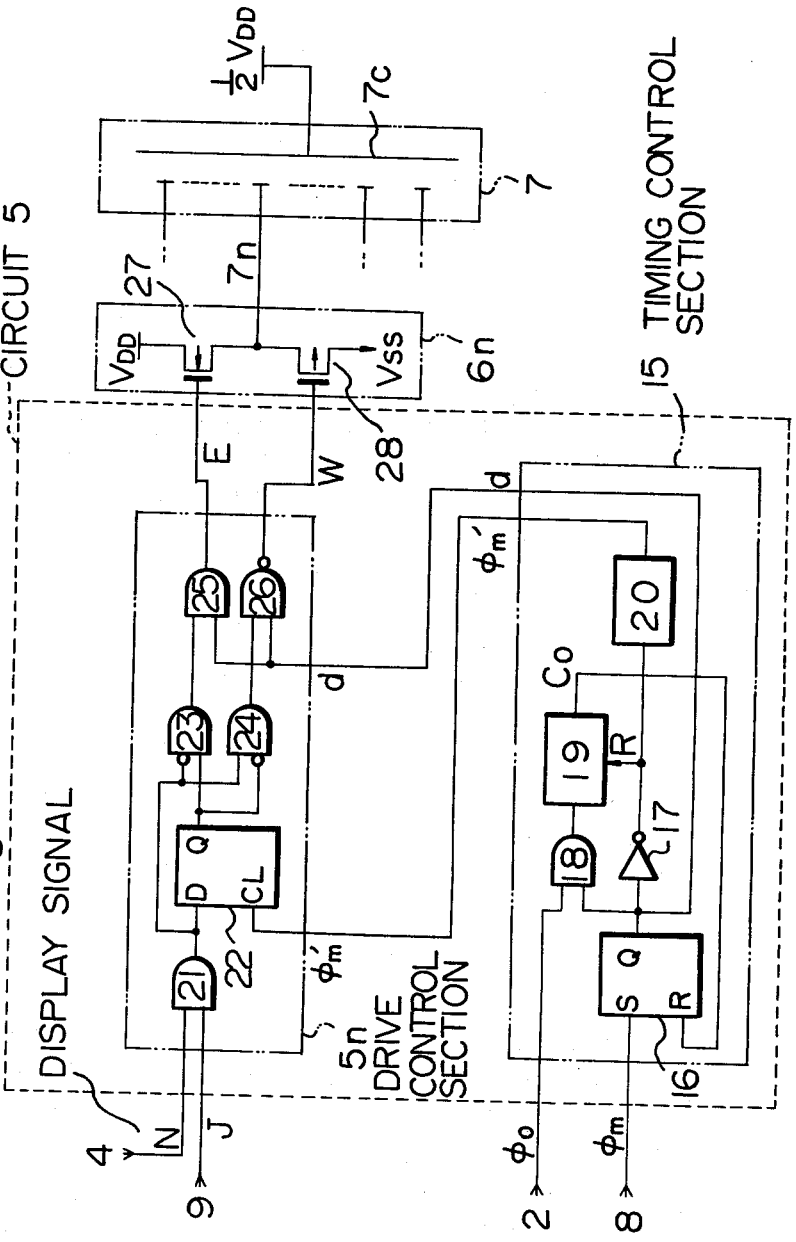
FIG. 4 is a circuit diagram of a drive control circuit and drive circuit used in the embodiment of FIG. 1.

FIG. 4 is a circuit diagram showing an example of the configuration of drive control circuit 5, drive circuit 6, and part of EC display elements 7 which are shown in FIG. 1. FIG. 5 is a timing chart for the circuits shown in FIG. 2 and FIG. 4. In FIG. 4, only the means for driving one of the segment electrodes is shown, denoted as 7n, which forms part of the least significant display digit (e.g. the units of minutes display digit), from among the plurality of EC display elements 7.

In the "display on" condition and in the "display off" condition, the display signal N is held at the H level and at the L level respectively. This display signal N is transferred, as display on/off data for segment 7n, from decoder 4. Changes in the logic level of this signal N take place at timings which are synchronized with the rising edges of pulse of signal $\phi$m, described above. This is also true of the display signals applied to the segment electrodes of all of the other display digits. When the output signal (referred to in the following as the temperature signal J) from the Q output of D-FF 13 in temperature data generating circuit 9 changes in logic level, then such a change will occur at a timing which is synchronized with a falling edge of a pulse of signal $\phi$t.

When a pulse of signal $\phi$m is input to control section 15 of drive control circuit 5, then firstly, RS-FF 16 is set, and as a result, AND gate 18 is enabled, while the output from inverter 17 goes to the L logic level. Timer circuit 19 is thereby released from the forcibly reset state. As a result, timer circuit 19 begins to count pulses of a relatively high frequency (for example, in the range 4 to 64 Hz) clock signal $\phi\emptyset$ which is sent from frequency divider 2 through AND gate 18. When the count value reaches a predetermined value, i.e. after a predetermined time interval has elapsed, then output C$\emptyset$ goes to the H level, and FF 16 is again put in the reset state. As a result of this process, a pulse d of width d$\emptyset$ is output from the Q terminal of FF 16 which rises in synchronism with the rising edge of a pulse of signal $\phi$m. Signal pulse d$\emptyset$ is transferred through AND gate 25 and NAND gate 26. In addition, a signal $\phi$m' is produced from positive-edge trigger type differentiator circuit 20, comprising a pulse which is delayed with respect to signal $\phi$m by an amount d$\emptyset$. This signal is applied to the clock terminal CL of a D-FF 22 (described hereinafter). The pulse width d$\emptyset$ of the signal d pulses output from the Q terminal of FF 16 serves to determine the duration of display write and erase drive of display elements 7, as described hereinafter. Accordingly, if timer circuit 19 is made a programmable counter, and if the preset state of this counter is controlled in accordance with variations in the ambient temperature, then the value of pulse width d$\emptyset$ will vary in accordance with changes in ambient temperature, i.e. the durations for which display drive signals are applied will vary in accordance with ambient temperature. In this way it is possible to apply temperature compensation to display element drive operations.

In addition to timing control section 15, drive control circuit 5 comprises a drive control section 5n for controlling driving of display segment electrode 7n. This drive control section 5n comprises an AND gate 21, to which the display signal N and the temperature signal J are applied, and a D-FF 22 to whose clock terminal signal $\phi$m' is input.

The operation will first be described for the case in which temperature signal J is at the H level, i.e. the condition in which the ambient temperature T has become lower than the upper limit temperature. Firstly, if it is assumed that display signal N has changed from the L logic level ( the display OFF state) to the H logic level (the display ON state), at a timing which is synchronized with the rising edge of pulse $\phi$m1 shown in FIG. 5, then as a result the output from AND gate 21 will change from the L to the H logic level. Next, FF22 will be set, synchronized with the falling edge of pulse $\phi$m1'. As a result, a pulse w1 is output from inhibit circuit 24, having a rising edge which is synchronized with the rising edge of the output from AND gate 21 (i.e. with the rising edge of display signal N) and having a negative-going edge which is synchronized with the falling edge of the output from FF 22. Accordingly, an inverted pulse W1 is output from NAND gate 26, which has a negative-going edge that is synchronized with the positive-going edge of display signal N and which has a positive-going edge that is synchronized with the negative-going edge of pulse d1 from the Q output of FF 16. In other words, this pulse W1 is the inverse of pulse d1. Signal W1 is applied to the gate electrode of a P-channel FET 28 in drive circuit section 6n, as display write-in control signal W. The P-channel FET 28 is thereby set in the ON state for a time interval equal to the width of pulse W1 (i.e. for a time interval equal to the pulse width d$\emptyset$). Current thereby flows from common electrode 7c of display elements 7 to the segment electrode 7n so that a display write drive operation is performed on display electrode 7n. Next, when display signal N rises from the H level (i.e. the ON state) to the L level (i.e. the OFF state) in synchronism with the rising edge of signal $\phi$m3, then the output of AND gate 21 thereby goes from the H logic level to the L logic level, and FF 22 is inverted to the reset state in synchronism with the falling edge of the next pulse $\phi$m3'. During this time, a pulse e1 is output from inhibit circuit 23, which rises in synchronism with the negative-going edge of display signal N, and which has a negative-going edge that is synchronized with the negative-going edge of the Q output of FF22. As a result, a pulse E3 is output from AND gate 25, which has a positive-going edge that is synchronized with the negative-going edge of display signal N and which has a negative-going edge that is synchronized with the negative-going edge of pulse D3 from the Q output of FF 16, in other words E3 corresponds to pulse D3 transferred through AND gate 25. This signal E3 is appied to the gate electrode of N-channel FET 27 as a display erase control signal E.

The N-channel FET 27 is thereby set in the ON state for a time duration which is equal to the pulse width of signal E3 (i.e. for a time which is equal to the pulse width d$\phi$). Current thereby flows from segment electrode 7n into the common electrode 7c, so that a display erase operation is performed through segment electrode 7n.

The operation will now be described for the case in which the ambient temperature T becomes higher than the upper limit temperature T$\phi$, so that the temperature signal J goes to the L logic level. If it is assumed that ambient temperature T becomes higher than T$\phi$ at a point in time which occurs between pulses $\phi$t4 and $\phi$5, and if it is also assumed that display signal N is held at the H logic level, and that a display write condition has been established for segment electrode 7n by signal W4, then temperature signal J will go from the H logic level to the L logic level in synchronism with the falling edge of pulse $\phi$5. In addition, the output of AND gate 21 will change from the H logic level to the L logic level. In other words, if it is assumed that temperature signal J is at the L logic level, then the output of AND gate 21 will go to the L logic level irrespective of the state of display signal N. As a result, FF 22 will be reset, in synchronism with the falling edge of the next pulse $\phi$m5'. During this time, i.e. until FF 22 becomes reset, a pulse e5 is output from inhibit circuit 23, which has a positive-going edge synchronized with the negative-going edge of the output from AND gate 21 (i.e. the negative-going edge of temperature signal J), and which has a negative-going edge which is in synchronism with the negative-going edge of the Q output of FF 22. The display erase control signal E5 is thereby output from AND gate 25, i.e. a pulse corresponding to d5 which is transferred through AND gate 25 while this gate is in the ON state during pulse width e5. Signal E5 causes a display erase drive operation to be performed through electrode 7n.

When temperature signal J goes to the L logic level, then the control sections for all of the segment electrodes perform the same operations as have been described for the drive control section 5n of electrode 7n, described in the above as an example of this operation. As a result when the ambient temperature T rises above the upper limit temperature, and the temperature signal J goes to the L logic level, then each of the segment electrodes which is in the display write state is subjected to a display erase drive operation, upon the next pulse d, with all of the corresponding display segments being simultaneously erased. All of the display digits of EC display elements 7 are thereafter held in the erased state. The output from AND gate 21 will be held at the L logic level until the temperature signal J returns to the H logic level, so that no output will be produced from inhibit circuit 24. Thus, a state in which new write drive operations are inhibited is maintained.

While display signal N is held at the H logic level (i.e. during the interval from $\phi$t6 to $\phi$t7), it will be assumed that the ambient temperature becomes lower than the upper limit temperature. As a result, temperature signal J is returned from the L logic level to the H logic level by pulse $\phi$t7, and at the same time the output of AND gate 21 goes from the L logic level to the H logic level. When the next pulse $\phi$m6' occurs therefore, the Q output of FF 22 is inverted to the H logic level, and a pulse w7 is output from inhibit circuit 24. The rising edge of this pulse is in synchronism with the positive-going edge of the output from AND gate 21 and the negative-going edge is synchronized with the positive-going edge of the output from FF 22. As a result of this pulse w7, and the pulse d7 which is output from FF 16, an inverted pulse W7 is output from NAND gate 26 as the display write control signal. This causes a display write drive operation to be executed through electrode 7n. Furthermore, when pulse $\phi$m7 is generated, corresponding display signals for the other segment electrodes will go to the H logic level, resulting in the operations described above for electrode 7n being also performed upon those other electrodes which should be performing a write operation upon their corresponding display segments.

Thus, upon the first pulse d after temperature signal J has returned to the H logic level, write-in drive operations are performed to set all of the appropriate display digits into the correct display state.

At time $\phi$t9 in FIG. 5, it is assumed that temperature signal J returns from the L logic level to the H logic level. However at that time, display signal N is being held at the L logic level, i.e. the display segment N is being held at the L logic level (i.e. that segment is in the display OFF state), so that the output of AND gate 21 is held at the L logic level. It will therefore be apparent that no display write drive operation will take place in this case.

Thus, with the present invention, as described in the above, when it is detected that the ambient temperature of an electronic timepiece has risen above a predetermined upper limit temperature, then new display write operations for EC display elements of that timepiece are inhibited. In this way, if an electronic timepiece having EC display elements and control and detection means according to the present invention is left for example in an automobile in very hot weather, then even if the ambient temperature of the electronic timepiece becomes extremely high, no sudden reduction of the repetition lifetime of the EC display elements in the timepiece will occur.

In addition, since it is arranged that the timing at which the results of temperature sensing are stored in a detection result memory circuit is displaced from the timing of display write or erase operations, so as not to overlap in time with these display write or erase operations during operation at normal temperatures below the upper limit temperature, no display errors will result due to imperfect display write or erase operations caused by changes in the temperature data signal occurring while display write or erase operations are in progress.

If it is arranged that, as described for the above embodiment, control is performed not only of inhibiting display write operations but also inhibiting display erase drive operations, then unnecessary power dissipation can be prevented.

Although in the above embodiments a thermistor 9a is used in the temperature sensing circuit, it is possible to use other temperature sensing means, so long as a circuit is provided which will sense the ambient temperature at predetermined detection timings.

Although the present invention has been described with reference to a specific embodiment, it should be noted that various changes and modifications to the configuration described above may be envisaged, which fall within the scope claimed for the present invention, as set out in the appended claims.

What is claimed is:

1. An electronic timepiece, comprising:
   timekeeping circuit means for generating timekeeping signals representing at least hours time information;
   drive circuit means responsive to said timekeeping signals for selectively generating display write drive signals and display erase drive signals in response to said timekeeping signals;
   an electro-chromic display device comprising a plurality of display elements, responsive to said display write drive signals for setting specific ones of said display elements into a colored state and responsive to said display erase drive signals for setting specific ones of said display elements into a non-colored state, for thereby displaying time information in accordance with said timekeeping signals;
   temperature monitor circuit means for sensing the ambient operating temperature of said electronic timepiece, and for generating temperature signals selectively indicating that said ambient temperature is above a predetermined upper limit temperature and below said upper limit temperature; and
   control circuit means responsive to said temperature signals for enabling input of said display write drive signals to said electro-chromic display device when said ambient temperature is below said upper limit temperature and for inhibiting input of said display write drive signals to said electro-chromic display device when said ambient temperature is above said upper limit temperature.

2. An electronic timepiece according to claim 1, in which said temperature monitor circuit means comprises means for periodically sensing said ambient temperature and memory circuit means for memorizing the results of said periodic sensing operations, with the timings of each of said periodic temperature sensing operations being different from the timings of generation of any of said display write drive signals and display erase drive signals.

3. An electronic timepiece according to claim 1, in which said control circuit means are responsive to said temperature signals indicating that said ambient temperature is higher than said upper limit temperature for controlling said drive circuit means to produce display erase signals to set all of said display elements in said non-colored state, irrespective of the condition of said timekeeping signals.

* * * * *